(12) United States Patent
Shimizu

(10) Patent No.: US 7,859,480 B2
(45) Date of Patent: Dec. 28, 2010

(54) ANTENNA AND PORTABLE ELECTRONIC DEVICE

(75) Inventor: Takayuki Shimizu, Higashiyamato (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 605 days.

(21) Appl. No.: 11/891,270

(22) Filed: Aug. 9, 2007

(65) Prior Publication Data

US 2008/0055046 A1 Mar. 6, 2008

(30) Foreign Application Priority Data

Aug. 31, 2006 (JP) ............... 2006-236847
Jul. 17, 2007 (JP) ............... 2007-185969

(51) Int. Cl.
*H01Q 1/36* (2006.01)

(52) U.S. Cl. ...................... 343/895; 343/702

(58) Field of Classification Search .......... 343/702, 343/895, 741, 742
See application file for complete search history.

(56) References Cited

U.S. PATENT DOCUMENTS

| | | | | |
|---|---|---|---|---|
| 5,541,399 A | * | 7/1996 | de Vall ........................ | 235/491 |
| 5,574,470 A | * | 11/1996 | de Vall ........................ | 343/895 |
| 6,161,761 A | * | 12/2000 | Ghaem et al. ................ | 235/492 |
| 7,339,546 B2 | | 3/2008 | Pangaud et al. | |
| 7,342,548 B2 | | 3/2008 | Taniguchi et al. | |
| 7,439,933 B2 | * | 10/2008 | Uesaka ........................ | 343/895 |
| 2006/0181470 A1 | | 8/2006 | Pangaud et al. | |

FOREIGN PATENT DOCUMENTS

| | | |
|---|---|---|
| JP | 08-330840 | 12/1996 |
| JP | 2001-085926 | 3/2001 |
| JP | 2001-094322 | 4/2001 |
| JP | 2003-067692 | 3/2003 |
| JP | 2003-110338 | 4/2003 |
| JP | 2003-224415 | 8/2003 |
| JP | 2004-173293 | 6/2004 |
| JP | 2004-214709 | 7/2004 |
| JP | 2004-227046 | 8/2004 |

(Continued)

OTHER PUBLICATIONS

Office Action dated Jun. 13, 2008 issued for the counterpart Korean patent application (4 pgs.).

*Primary Examiner*—HoangAnh T Le
(74) *Attorney, Agent, or Firm*—Cohen Pontani Lieberman & Pavane LLP

(57) ABSTRACT

A portable electronic device having an RFID function has an RFID antenna having a planar coil formed by winding a conductor. The RFID antenna is a loop antenna having a loop diameter corresponding to RFID with a strong electromagnetic field characteristic, and has an antenna pattern where a part of its coil turn which is other than an innermost coil turn is placed inward of the innermost coil turn. The antenna pattern can be provided by bending or branching a part of a coil turn of the conductor which is other than the innermost coil turn in such a way that the part of the coil turn is laced inward of the innermost coil turn, thereby ensuring compensation for the magnetic field strength at the center portion of the antenna and achieving excellent communications without a non-communicatable area even with the RFID having a slight electromagnetic field characteristic.

2 Claims, 14 Drawing Sheets

FOREIGN PATENT DOCUMENTS

| | | |
|---|---|---|
| JP | 2004-320571 | 11/2004 |
| JP | 2005-070855 | 3/2005 |
| JP | 2005-318102 | 11/2005 |
| JP | 2006-074348 | 3/2006 |
| WO | WO 2004/090793 | 10/2004 |

* cited by examiner

PRIOR ART

ANTENNA AND PORTABLE ELECTRONIC DEVICE

BACKGROUND OF THE INVENTION

1. Field of the Invention

The present invention relates to an antenna for RFID (Radio Frequency Identification), which communicates with an external device by means of an electromagnetic field signal, and a portable electronic device having the antenna mounted therein.

2. Description of the Related Art

An electronic money function is realized by installing an RFID function into a portable electronic device such as a cellular phone. In this case, settlement is made through non-contact communication between a portable electronic device with, for example, a reader/writer sited in a shop or the like, or a reader/writer installed in an automatic ticket checking machine or the like for railroads.

In a portable electronic device installed with the RFID function that communicates with an external device by means of an electromagnetic field signal, an antenna coil for RFID is typically provided at a battery retaining section or the like in the device's case, as disclosed in, for example, Unexamined Japanese Patent Application KOKAI Publication No. 2003-67692, Unexamined Japanese Patent Application KOKAI Publication No. 2004-227046 and Unexamined Japanese Patent Application KOKAI Publication No. 2004-320571.

Unexamined Japanese Patent Application KOKAI Publication No. 2003-67692 discloses the configuration that has a radio communication module integrally mounted in the battery lid of a cellular phone. The radio communication module has an antenna coil, an IC chip connected thereto and an electromagnetic shield member is integrated with the interior of the battery lid.

Unexamined Japanese Patent Application KOKAI Publication No. 2004-227046 discloses an RFID apparatus which communicates with an automatic ticket checking machine using an electromagnetic field. A board having an RFID antenna coil printed thereon is provided at the battery retaining section of a cellular phone, and the antenna coil is arranged on the battery lid side. Specifically, the antenna coil is printed on the board in a rectangular spiral pattern, and an IC and a resonance capacitor which are to be connected to the antenna coil are mounted on the board.

Unexamined Japanese Patent Application KOKAI Publication No. 2004-320571 discloses a configuration where the antenna of an RFID reader/writer or tag is attached to outside a battery in parallel to the surfaces thereof, or a configuration where the antenna is attached to a cover lid. The tag is installed in a prepaid type card and has an antenna coil wound in a spiral form and an IC chip configured to be electrically connected to the antenna coil and to be able to store unique information of a card owner.

The RFID that is realized by such a configuration generally has a characteristic such that the larger the area surrounded by the loop of the antenna coil (coil loop area) or the loop diameter is, the higher the communication distance characteristic becomes.

For example, the RFID system which is used in an automatic ticket checking gate or the like of a public transport such as railroads is demanded of a relatively long communication distance characteristic to permit a user to pass the gate smoothly. In this respect, such the RFID system uses an antenna with a long communication distance or a relatively large loop diameter for the reader/writer, and uses an antenna with a relatively large loop diameter for an electronic train ticket. That is, the RFID system uses an antenna having a strong electromagnetic field characteristic.

On the contrary, an RFID system to be used in an electronic settlement machine or the like which is sited in a shop or the like is demanded of a relatively short communication distance characteristic to prevent erroneous connection. In this respect, such the RFID system uses an antenna with a short communication distance for a reader/writer, or an antenna with a relatively small loop diameter, and an antenna with a relatively small loop diameter for an electronic wallet (prepaid card). That is, the RFID system uses an antenna having a slight electromagnetic field characteristic.

There arises no problem if RFID systems require different antenna characteristics as long as the systems use different RFID cards. When a portable electronic device is equipped with the RFID function, however, plural types of RFID systems can be used in changing an application, thus requiring an antenna compatible with a plurality of RFID systems.

Because the conventional antenna coil used for RFID have a simple structure of having a plurality of turns in a spiral form as shown in FIGS. 14A and 14B, however, it is difficult to make the antenna coil compatible with both of the aforementioned two types of RFID systems.

That is, if the loop diameter of the RFID antenna to be mounted in a portable electronic device is made larger in such a way as to be compatible with an RFID system such as an automatic ticket checking machine, a communication failure may occur when the portable electronic device communicates with a reader/writer which is used for settlement of an electronic money in a shop or the like.

In a loop antenna, while a magnetic field is generated at the conductive portion forming the loop, the magnetic field strength becomes lower at a portion near the center of the loop where the conductive portion is not present. When the loop diameter of the loop antenna of the portable electronic device is larger than that of the loop antenna of the reader/writer, the center portion of the loop antenna of the portable electronic device comes close to the position corresponding to the loop antenna of the reader/writer. In this case, the center portion of the loop antenna has a lower magnetic field, making the amount of the magnetic flux crossing both the loop antenna and the reader/writer smaller.

The use of the load modulation system in RFID makes a load modulation signal weaker when the amount of the magnetic flux is small, generating a non-communicatable area or so-called proximal Null. The generation of such a non-communicatable area disables communications between the portable electronic device and the electronic settlement machine even if the former is placed over the latter.

Accordingly, it is an object of the present invention to provide an antenna and a portable electronic device in an RFID system, which can reliably communicate with a reader/writer for a slight electromagnetic field whose loop antenna has a relatively small loop diameter as well as a reader/writer for a strong electromagnetic field whose loop antenna has a relatively large loop diameter.

SUMMARY OF THE INVENTION

To achieve the object, according to a first aspect of the invention, there is provided a loop antenna comprising:

a planar coil formed by winding a conductor; and an antenna pattern in which a part of a coil turn of the conductor which is other than an innermost coil turn is placed inward of the innermost coil turn.

To achieve the object, according to a second aspect of the invention, there is provided a portable electronic device having an RFID function comprising:

a loop antenna for use in the RFID function, the loop antenna having a planar coil formed by winding a conductor, wherein the loop antenna has a loop diameter corresponding to RFID with a strong electromagnetic field characteristic, and has an antenna pattern in which a part of a coil turn of the conductor which is other than an innermost coil turn is placed inward of the innermost coil turn.

EFFECT OF THE INVENTION

The present invention can ensure reliable communication with a reader/writer for a slight electromagnetic field whose loop antenna has a relatively small loop diameter as well as a reader/writer for a strong electromagnetic field whose loop antenna has a relatively large loop diameter.

BRIEF DESCRIPTION OF THE DRAWINGS

These objects and other objects and advantages of the present invention will become more apparent upon reading of the following description and the accompanying drawings in which.

DETAILED DESCRIPTION OF THE PREFERRED EMBODIMENTS

The best mode of carrying out the present invention will be described below with reference to the accompanying drawings.

The following description is given of the case where a portable electronic device according to the invention is worked out as a foldable cellular phone. A cellular phone 100 according to the best mode has an RFID (Radio Frequency Identification) function to make settlement using electronic money through wireless communication with a redetermined reader/writer in addition to a speech communication function as the basic function.

Figure 1:
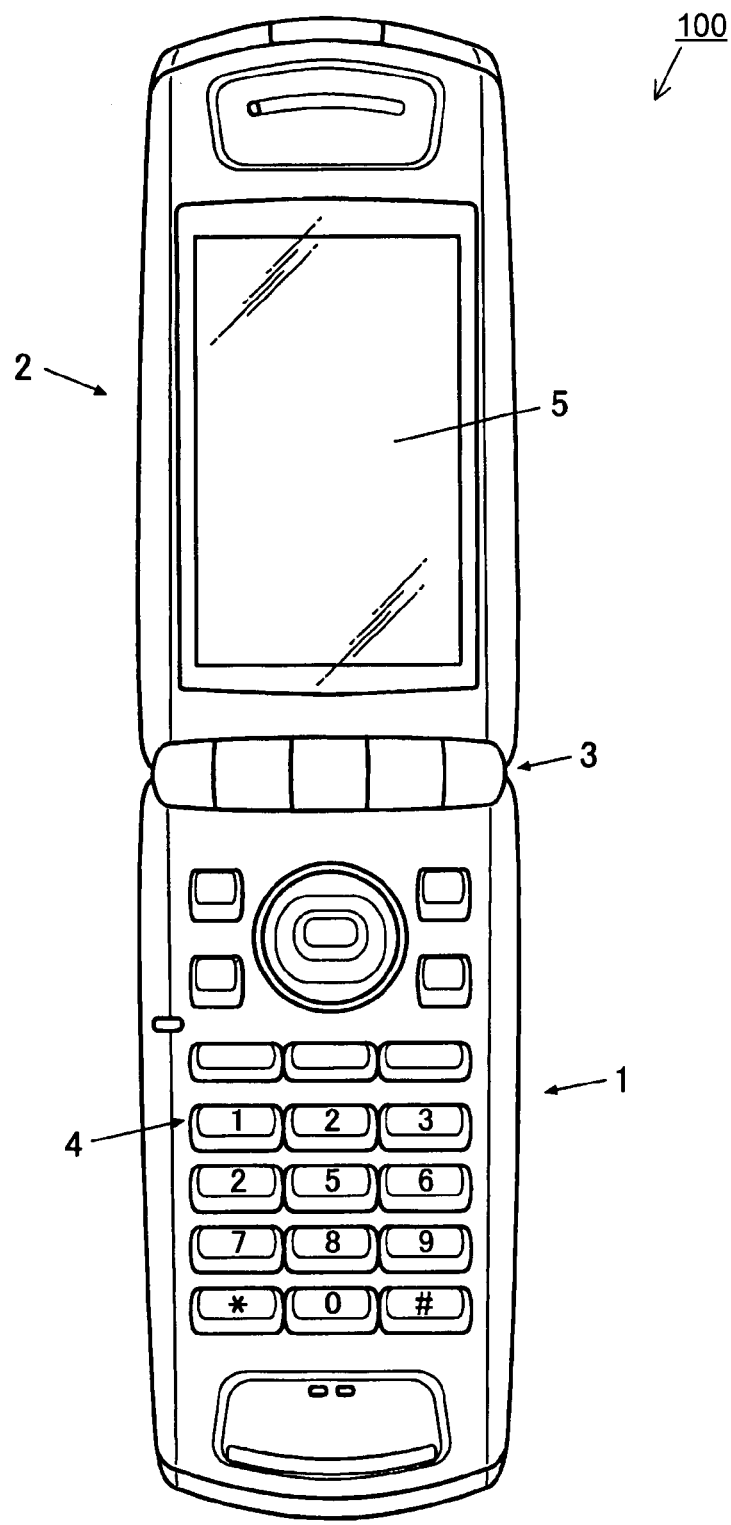
FIG. 1 is a diagram showing the outer appearance of a foldable cellular phone according to one embodiment of the invention in an open state.

The configuration of the cellular phone 100 according to the best mode will be explained referring to the accompanying drawings. FIG. 1 shows the outer appearance of the foldable cellular phone 100 according to the best mode in an open state. As illustrated, the cellular phone 100 of the best mode is configured so that a first casing 1 and a second casing 2 are coupled together in a foldable manner through a hinge portion 3.

The first casing 1 has an operational section 4 including various keys, a communication microphone, etc. The second casing 2 has a main display section 5, a communication speaker, etc.

Figure 2:
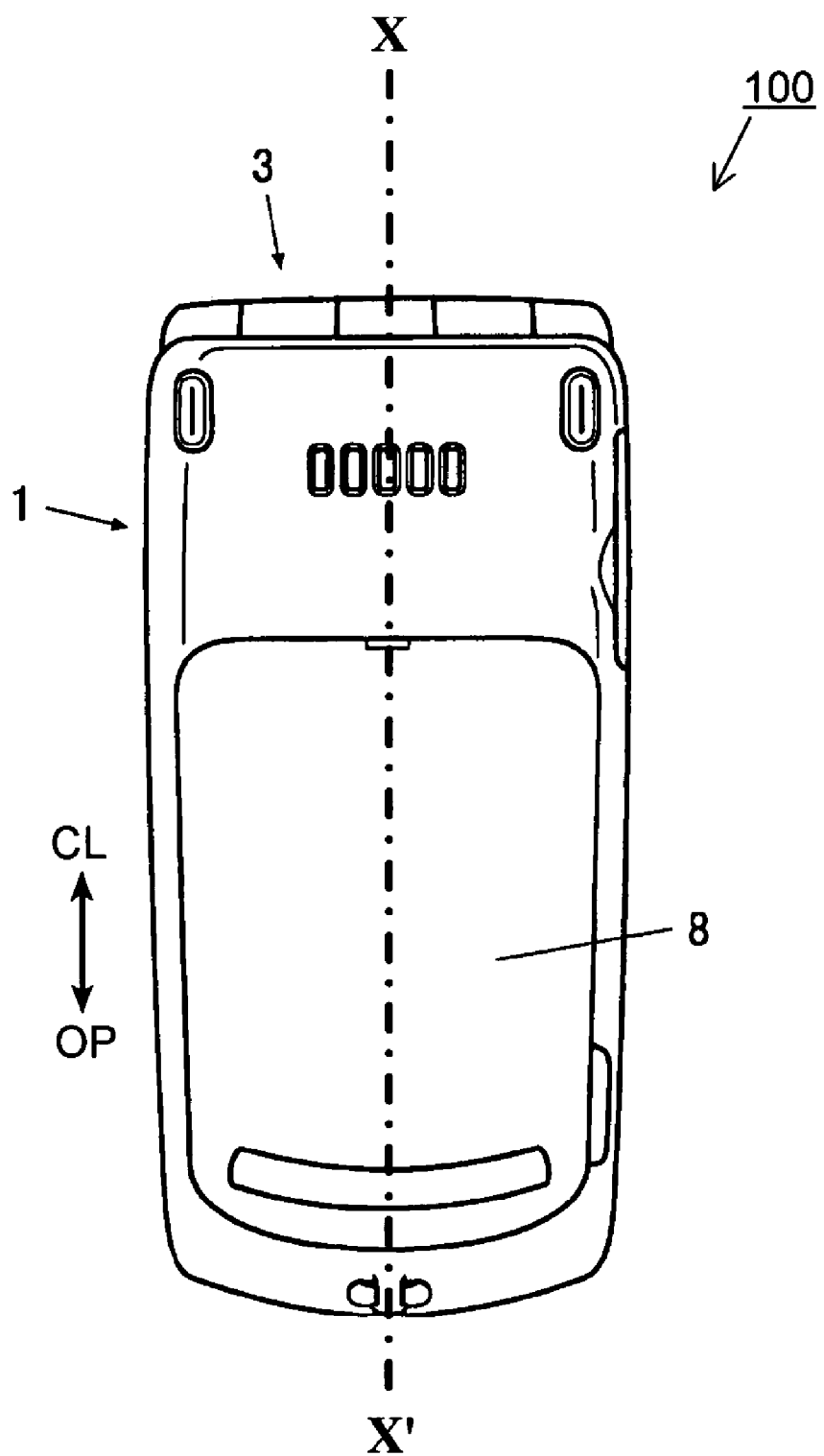
FIG. 2 is a diagram showing the bottom side of a first casing with the cellular hone in FIG. 1 folded.

FIG. 2 is a diagram showing the bottom side of the first casing 1 with the cellular phone in FIG. 1 folded. An arrow-heading direction CL in FIG. 2 indicates the closing direction of a slidable battery lid 8 provided on the bottom side of the first casing 1, and an arrow-heading direction OP indicates the opening direction of the battery lid 8.

Figure 3:
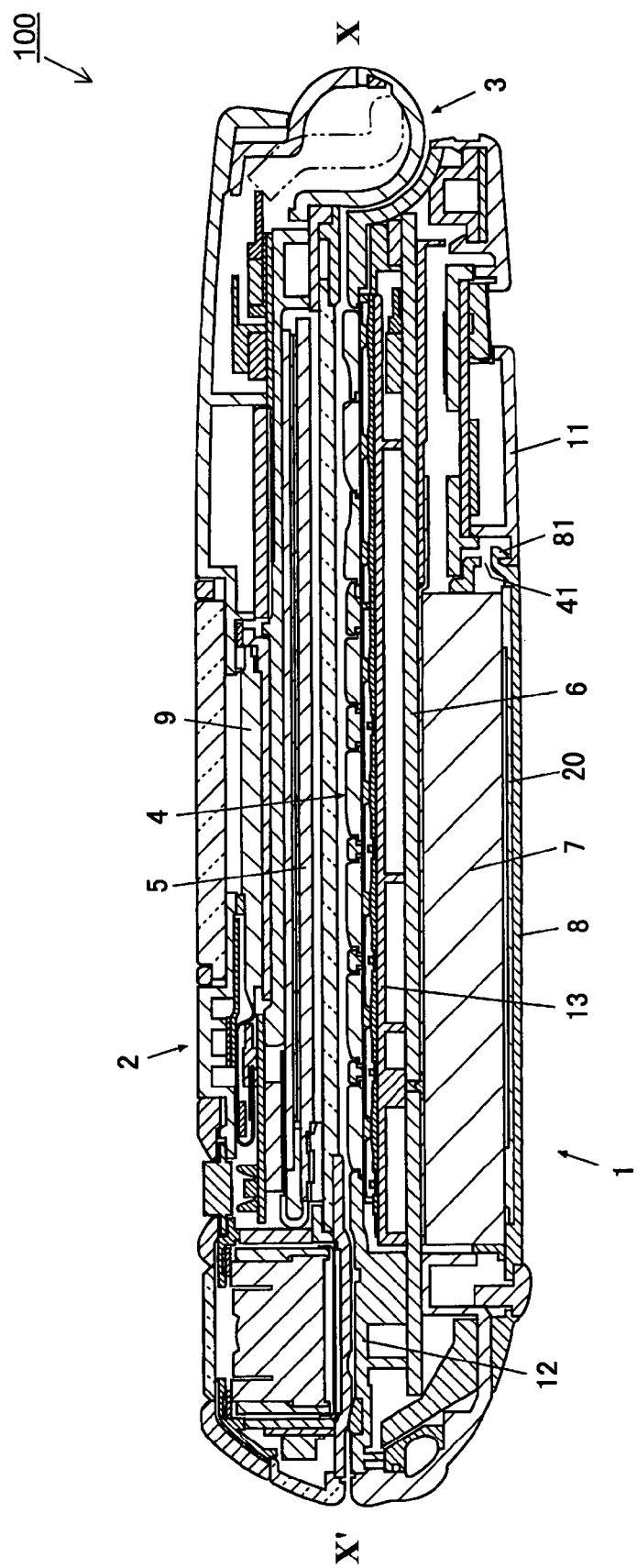
FIG. 3 is a cross-sectional view showing the internal configuration of the cellular hone along a dot chain line X-X' in FIG. 2.

FIG. 3 is a cross-sectional view showing the cross section of the cellular phone 100 along a dot chain line X-X' in FIG. 2. As illustrated, a circuit board 6, a battery pack 7, etc. are accommodated in the first casing 1. The battery pack 7 is disposed opposite to the operational section 4 with the circuit board 6 in between, and is covered with the battery lid 8. A sub display section 9 and some other components are provided in the second casing 2. The sub display section 9 is disposed opposite to the main display section 5.

Figure 4:
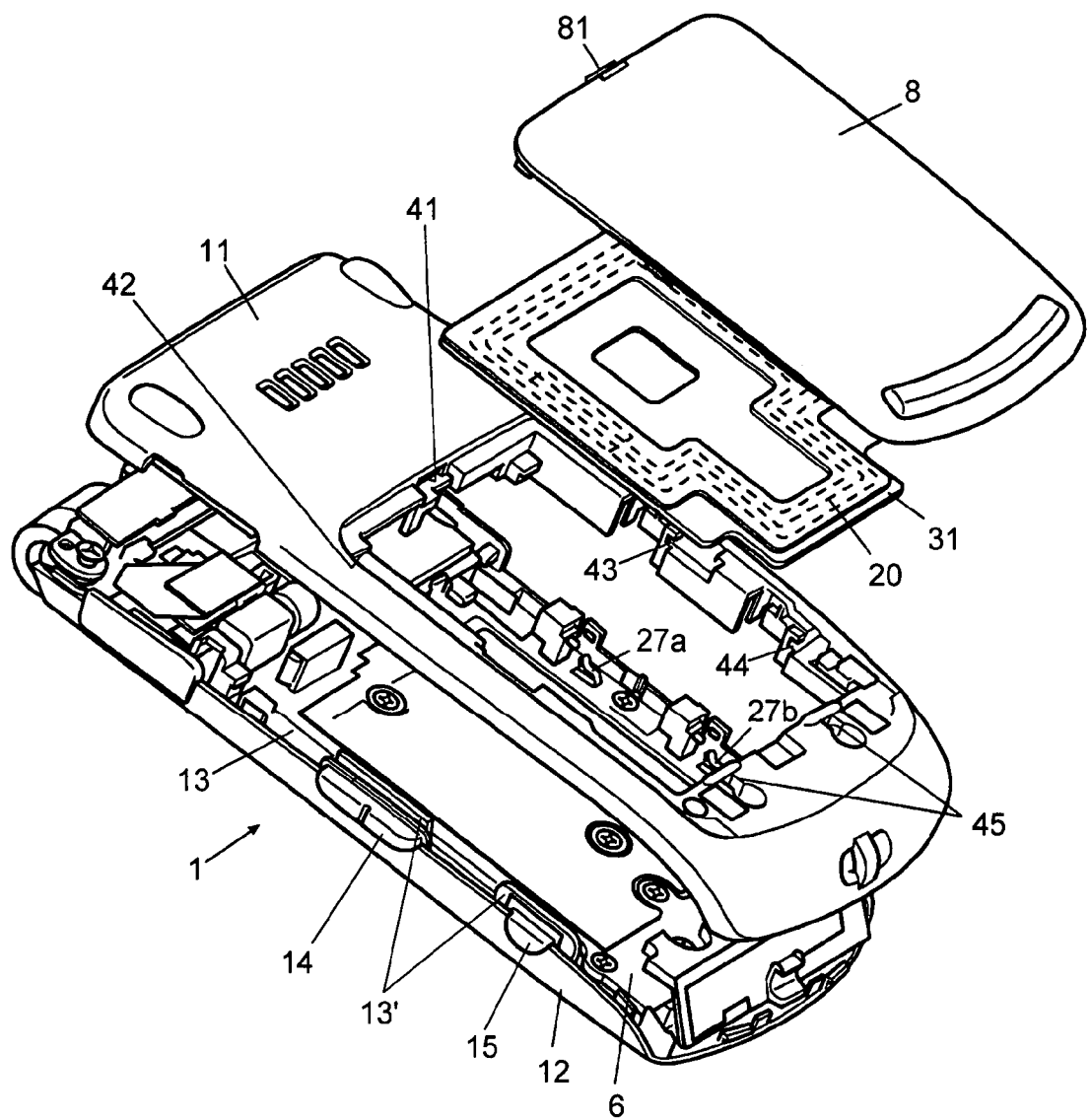
FIG. 4 is an exploded perspective view showing the internal structure of the first casing.

FIG. 4 is an exploded perspective view showing the internal structure of the first casing 1. As illustrated, the first casing 1 is configured by assembling a lower case 11, an upper case 12 and a middle case 13.

The lower case 11 and the upper case 12 are exterior cases of a resin, for example, while the middle case 13 is a metal frame member of a magnesium alloy, for example. The first casing 1 is configured by assembling the lower case 11 constituting the bottom-side exterior portion of the first casing 1 and the upper case 12 constituting the operational-surface side exterior portion of the first casing 1 in such a way as to enclose the middle case 13.

In the thus configured first casing 1, an opening (battery retaining opening) for retaining the battery pack 7 to be the operational power source of the cellular phone 100 is formed in the lower case 11. At the time of using the cellular phone 100, as the battery pack 7 is inserted through the battery retaining opening of the lower case 11, the battery pack 7 is held in the middle case 13.

Therefore, the battery lid 8 is so configured as to cover the battery retaining opening in such a manner as to be attachable to and detachable from the lower case 11. A plurality of engagement recesses 41, 42, 43, 44, 45 are formed around the battery retaining opening of the lower case 11 to stop the battery lid 8.

The circuit board 6 having various circuits including an RFID circuit mounted thereon is fixed to the middle case 13. Contact springs 27a, 27b for electrically connecting the battery lid 8 to the circuit board 6 are provided at the middle case 13.

The first casing 1 is provided at one side with side keys 14, 15 as shown in, for example, FIG. 4. A key sheet (not shown) for transmitting signals according to depression of those side keys to the circuit board 6 is disposed in the first casing 1. In this case, a key sheet support 13' which allows the terminal portions of the key sheet to contact the terminal portions of the side keys 14, 15 is provided. In the best mode, it is assumed that the key sheet support 13' is formed by protruding a part of the metal middle case 13.

As shown in FIG. 4, in the best mode, an RFID antenna 20 and a radio-wave absorbing sheet 31 are provided at the inner side of the battery lid 8. The details of the battery lid 8 will be explained referring to FIGS. 5A and 5B.

Figure 5A:
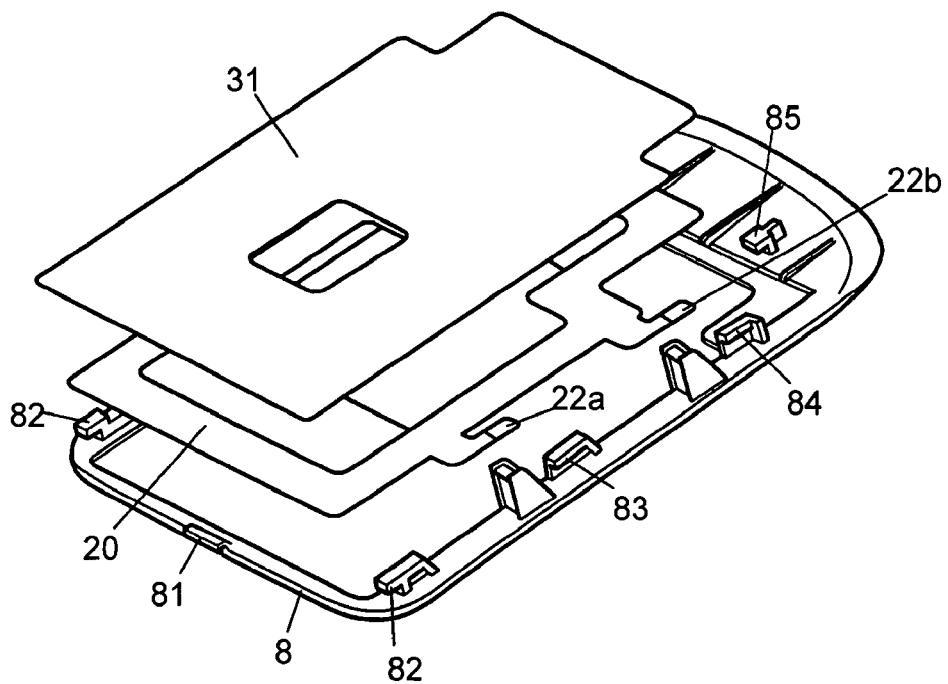
FIG. 5A is an exploded perspective view showing an example of how a battery lid, an antenna and a radio-wave absorbing sheet are adhered.
Figure 5B:
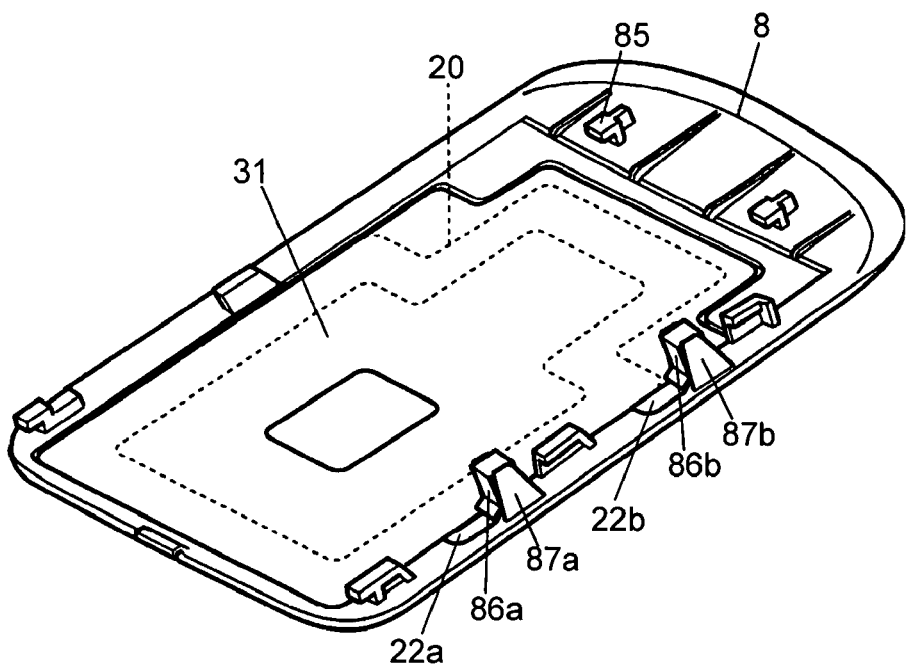
FIG. 5B is a perspective view showing the battery lid after the antenna and the radio-wave absorbing sheet are adhered together.

FIG. 5A is a perspective view for explaining the RFID antenna 20 and the radio-wave absorbing sheet 31 provided at the inner side of the battery lid 8, and FIG. 5B is a perspective view showing RFID antenna 20 and the radio-wave absorbing sheet 31 adhered to the inner side of the battery lid 8.

As shown in FIG. 5A, engagement projections 81, 82, 83, 84, 85 are provided at the peripheral portion of the inner side of the battery lid 8. The engagement projections 81, 82, 83, 84, 85 engage with the respective engagement recesses 41, 42, 43, 44, 45 (see FIG. 4) provided around the battery retaining opening of the lower case 11 to engage the battery lid 8 with the lower case 11.

The RFID antenna 20 and the radio-wave absorbing sheet 31 are adhered to the center portion of the inner side of the battery lid 8. The RFID antenna 20 comprises, for example, a flexible board having an antenna coil formed by a conductive pattern. The radio-wave absorbing sheet 31 which is a ferrite sheet is adhered to one side of the RFID antenna 20 by a double-coated adhesive tape or the like. The other side of the RFID antenna 20 is adhered to the inner side of the battery lid 8 by a double-coated adhesive tape or the like.

As shown in FIG. 5A, the RFID antenna 20 is provided with a pair of antenna terminals 22a, 22b projecting therefrom. When the RFID antenna 20 is adhered to the battery lid 8, the antenna terminals 22a, 22b contact a pair of lid terminals 86a, 86b, respectively, as shown in FIG. 5B. In this example, the antenna terminal 22a contacts the lid terminal 86a, and the antenna terminal 22b contacts the lid terminal 86b.

The lid terminals 86a, 86b are made, at one side portion of the battery lid 8, by metal members which cover the top portions of the terminal beds 87a, 87b protruding toward the lower case 11. When the battery lid 8 is engaged with the first casing 1, the terminal beds 87a, 87b reach the contact springs 27a, 27b of the middle case 13 through cutaway portions formed near the engagement recesses 43, 44 as shown in FIG. 4. As a result, the lid terminal 86a provided at the terminal bed 87a contacts the contact spring 27a, and the lid terminal 86b provided at the terminal bed 87b contacts the contact spring 27b, the RFID antenna 20 formed at the battery lid 8 is electrically connected to the circuit board 6 in the first casing 1.

Next, the antenna pattern of the RFID antenna 20 mounted on the battery lid 8 will be explained.

Figure 14A:
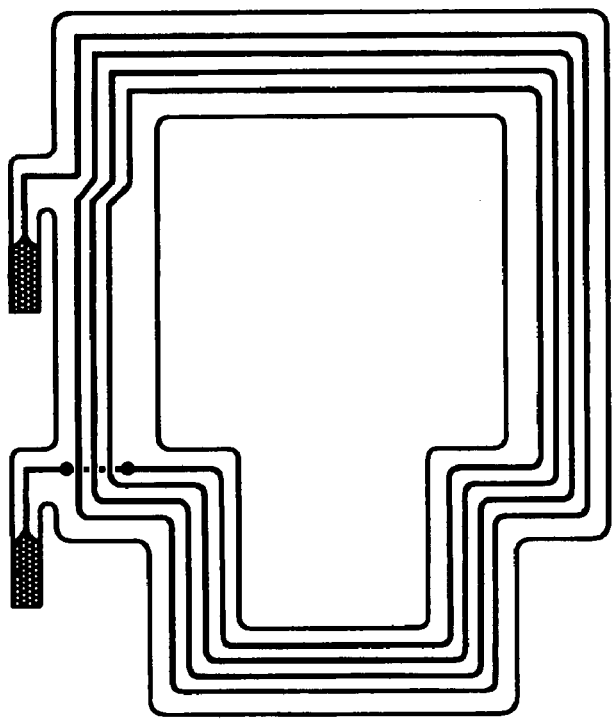
FIG. 14A is a plan view showing the configuration of the conventional RFID antenna.

Before going into the explanation of the antenna pattern of the RFID antenna 20 according to the invention, the antenna pattern of the conventional typical RFID antenna will be described referring to FIGS. 14A and 14B. FIG. 14A is a plan view showing the conventional RFID antenna, and FIG. 14B is a perspective view showing the conductive coil (antenna pattern) of the RFID antenna.

Figure 14B:
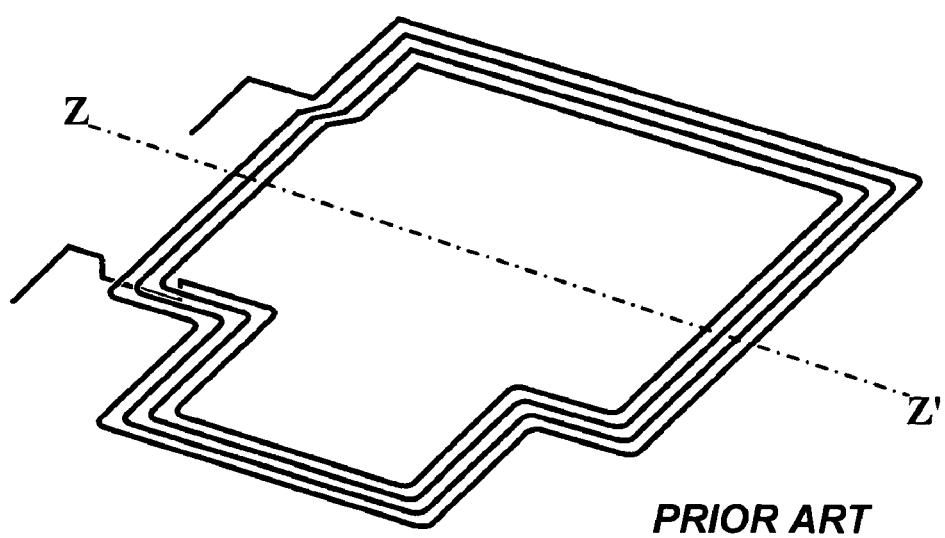
FIG. 14B is a perspective view showing the conductive coil of the RFID antenna shown in FIG. 14A.

As shown in FIGS. 14A and 14B, the conventional RFID antenna to be mounted in a cellular phone is formed by, for example, a loop antenna comprising a planar coil formed by winding the antenna coil in parallel according to the shape of the battery lid in which the loop antenna is to be mounted.

The RFID antenna to be mounted in the cellular phone 100 is used to ensure close-range wireless communications of the load modulation type with a predetermined reader/writer. In the best mode, for example, the RFID antenna is used in an RFID system which communicates with a reader/writer installed in an automatic ticket checking machine for railroads to make fare settlement (hereinafter "gate RFID"), an RFID system which communicates with a reader/writer responsive to a cash register in a shop or the like to make settlement (hereinafter "register RFID"), and the like.

A loop antenna is also used in the reader/writer. Such a loop antenna has a characteristic such that the larger the area surrounded by the loop is, i.e., the larger the coil loop area is, the stronger the electromagnetic field becomes, thereby leading to an improved communication distance characteristic.

The gate RFID is demanded of a relatively long communication distance characteristic to permit a user to pass the gate smoothly. In this respect, the gate RFID uses a reader/writer for a strong electromagnetic field (strong electromagnetic field RFID) which has a relatively large coil loop area (loop diameter).

By way of contrast, the register RFID is demanded of a relatively short communication distance characteristic to prevent erroneous connection. In this respect, the register RFID uses a reader/writer for a slight electromagnetic field (slight electromagnetic field RFID) which has a relatively small coil loop area (loop diameter).

The best mode is premised on that the RFID function of the cellular phone 100 enables RFID communications with both the strong electromagnetic field reader/writer and the slight electromagnetic field reader/writer.

If the RFID antenna to be mounted in the cellular phone 100 is designed to match with the antenna loop diameter of the slight electromagnetic field reader/writer, the communication distance characteristic that is needed for the gate RFID cannot be acquired. Therefore, the loop diameter of the conventional RFID antenna as shown in FIGS. 14A and 14B is designed to be the loop diameter corresponding to the strong electromagnetic field RFID, such as the gate RFID.

First Embodiment

Figure 6A:
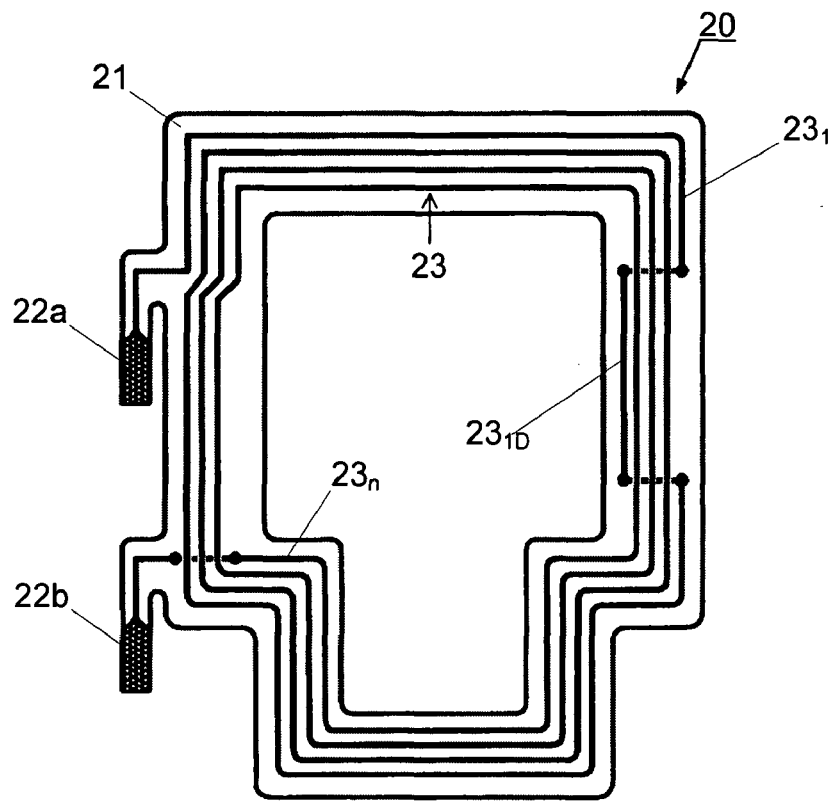
FIG. 6A is a plan view showing the configuration of an RFID antenna according to a first embodiment of the invention.
Figure 6B:
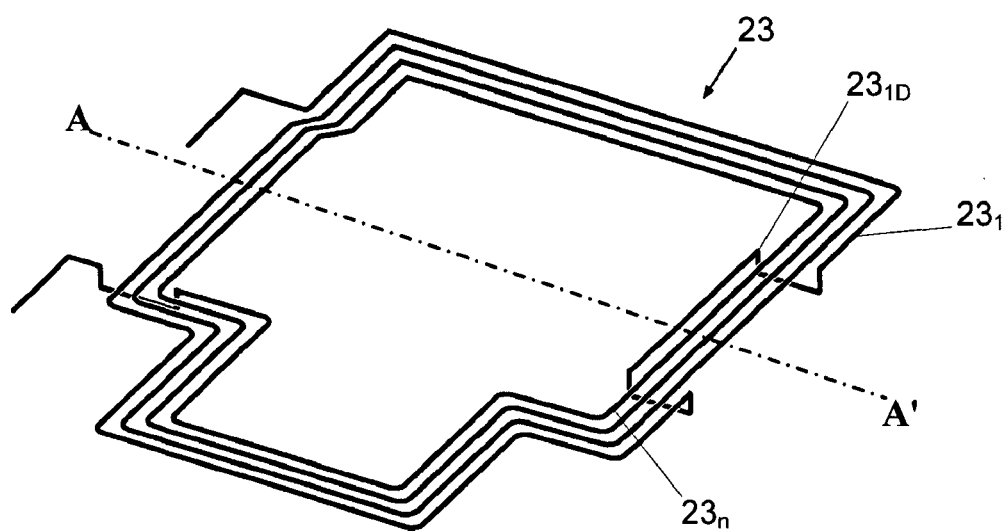
FIG. 6B is a perspective view showing the conductive coil of the RFID antenna shown in FIG. 6A.

The RFID antenna 20 according to the first embodiment of the present invention will be explained referring to FIGS. 6A and 6B. FIG. 6A is a plan view showing the configuration of the RFID antenna 20 according to the first embodiment, and FIG. 6B is a perspective view showing a conductive coil 23 of the RFID antenna 20 shown in FIG. 6A.

The RFID antenna 20 according to the first embodiment includes a base film 21, the antenna terminals 22a, 22b and the conductive coil 23, as shown in FIG. 6A.

The base film 21 is formed by a flexible board with its shape matching with the shape and size of the battery lid 8. As shown in FIG. 6A, the base film 21 has a center portion open, and a conductive pattern formed in a spiral form on one side thereof, thereby forming a loop antenna. That is, the size of the opening of the base film 21 is based on the size of the loop diameter that is required of the RFID antenna 20.

The conductive coil 23 is formed by a planar coil which is made of, for example, a metal conductive wire to be a conductor, and is wound linearly on the same plane from the one antenna terminal 22a to the other antenna terminal 22b.

In the embodiment, as shown in FIG. 6A, the conductive pattern is such that the conductive wire from the antenna terminal 22a becomes the outermost coil turn, and the conductive wire to be the innermost coil turn is connected to the antenna terminal 22b. In this case, the conductive coil 23 is wound by n turns, the outermost coil turn (first turn) of the conductive coil 23 is an outermost coil turn $23_1$, and the innermost portion of the conductive coil 23 is an innermost coil turn $23_n$. The basic configuration of the RFID antenna 20 explained above so far are common to individual embodiments of the invention.

The conductive coil 23 according to the first embodiment has an antenna pattern provided by bending a part of the outermost coil turn $23_1$ (e.g., linear portion) to partially form a curved portion $23_{1D}$ which is placed inward of the innermost coil turn $23_n$, as shown in FIGS. 6A and 6B.

The characteristics of the RFID antenna 20 with the conductive coil 23 formed this way will be explained referring to FIGS. 7A to 7C.

Figure 7A:
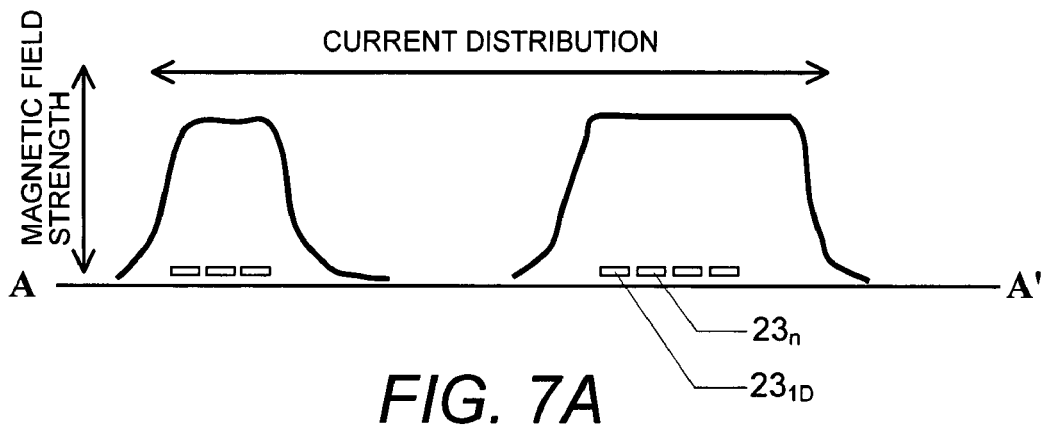
FIG. 7A is a diagram illustrating a current distribution and magnetic field strength along a dot chain line A-A' in FIG. 6B as the characteristics of the RFID antenna according to the first embodiment of the invention.

FIG. 7A is a diagram illustrating a current distribution and magnetic field strength along a dot chain line A-A' in FIG. 6B.

Figure 7B:
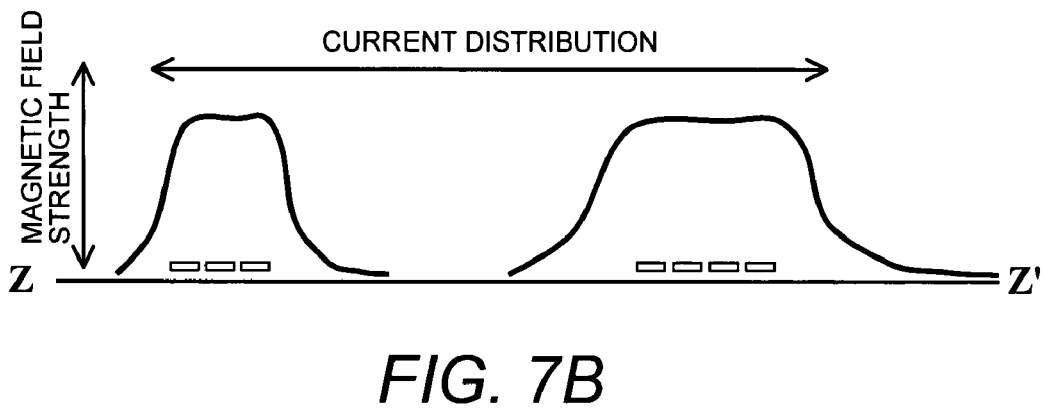
FIG. 7B is a diagram illustrating a current distribution and magnetic field strength along a dot chain line Z-Z' in FIG. 14 as the characteristics of the conventional RFID antenna.

FIG. 7B shows the characteristics of the conventional RFID antenna with the configuration as shown in FIGS. 14A and 14B for comparison of the characteristics of the RFID antenna 20 of the first embodiment with the characteristics of the conventional RFID antenna. FIG. 7B is a diagram illustrating a current distribution and magnetic field strength along a dot chain line Z-Z' in FIG. 14.

Figure 7C:
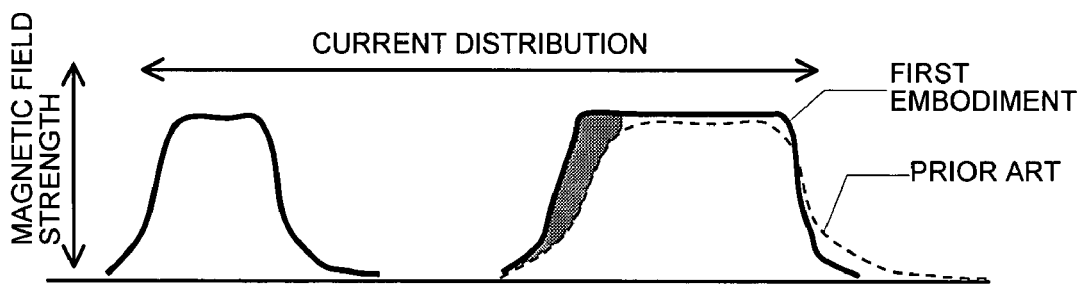
FIG. 7C is a diagram showing the characteristics of the RFID antenna according to the first embodiment of the invention shown in FIG. 7A and the characteristics of the conventional RFID antenna shown in FIG. 7B, one over the other.

FIG. 7C shows the characteristics of the RFID antenna 20 according to the first embodiment shown in FIG. 7A and the characteristics of the conventional RFID antenna shown in FIG. 7B, one over the other. In FIG. 7C, the broken line indicates the characteristics of the conventional RFID antenna while the solid line indicates the characteristics of the RFID antenna 20 according to the first embodiment.

Because the RFID antenna 20 of the first embodiment has the curved portion $23_{1D}$ passing inward of the innermost coil turn $23_n$ at the center portion of the RFID antenna 20 is higher than that of the conventional RFID antenna as shown by the hatching in FIG. 7C.

Because the RFID antenna is mounted in the cellular phone 100 according to the first embodiment has a relatively large loop diameter compatible with the strong electromagnetic field RFID as described above, the RFID antenna has a characteristic such that the magnetic field strength at the center portion of the antenna becomes low. When such an RFID antenna is set close to the reader/writer for a slight electromagnetic field which uses a loop antenna having a relatively small loop diameter, the center portion of the loop antenna has a lower magnetic field, making the amount of the magnetic flux crossing both the loop antenna and the reader/writer smaller. As a result, the load modulation signal becomes weaker, thus generating a non-communicatable area or so-called proximal Null.

Since the magnetic field strength at the center portion of the RFID antenna 20 of the first embodiment can be made higher than that of the conventional RFID antenna as shown in FIG. 7C, the magnetic field strength at the center portion of the antenna is compensated for even when the antenna is set close to the reader/writer for a slight electromagnetic field, so that the amount of the magnetic flux crossing both the antenna and the reader/writer does not decrease.

That is, the RFID antenna 20 reduces the occurrence of a non-communicatable area (proximal Null) originated from weak electromagnetic coupling that is caused by the impedance unmatching between the loop antenna and the reader/writer for a slight electromagnetic field which has a small loop diameter.

Therefore, it is possible to ensure reliable communication with a reader/writer for a slight electromagnetic field whose loop antenna has a relatively small loop diameter as well as a reader/writer for a strong electromagnetic field whose loop antenna has a relatively large loop diameter. That is, it is possible to ensure reliable communication with a reader/writer for a slight electromagnetic field whose communication distance is, for example, 10 to 20 cm, as is used in an automatic ticket checking machine or the like, as well as a reader/writer for a strong electromagnetic field whose communication distance is less than, for example, 5 cm, as is used in an electronic settlement machine or the like.

Second Embodiment

Although the curved portion $23_{1D}$ that compensates for the magnetic field strength at the center portion of the RFID antenna 20 is formed by bending the outermost coil turn $23_1$ of the conductive coil 23 of the RFID antenna 20 in the first embodiment, a portion other than the outermost coil turn $23_1$ may be bent.

Figure 8A:
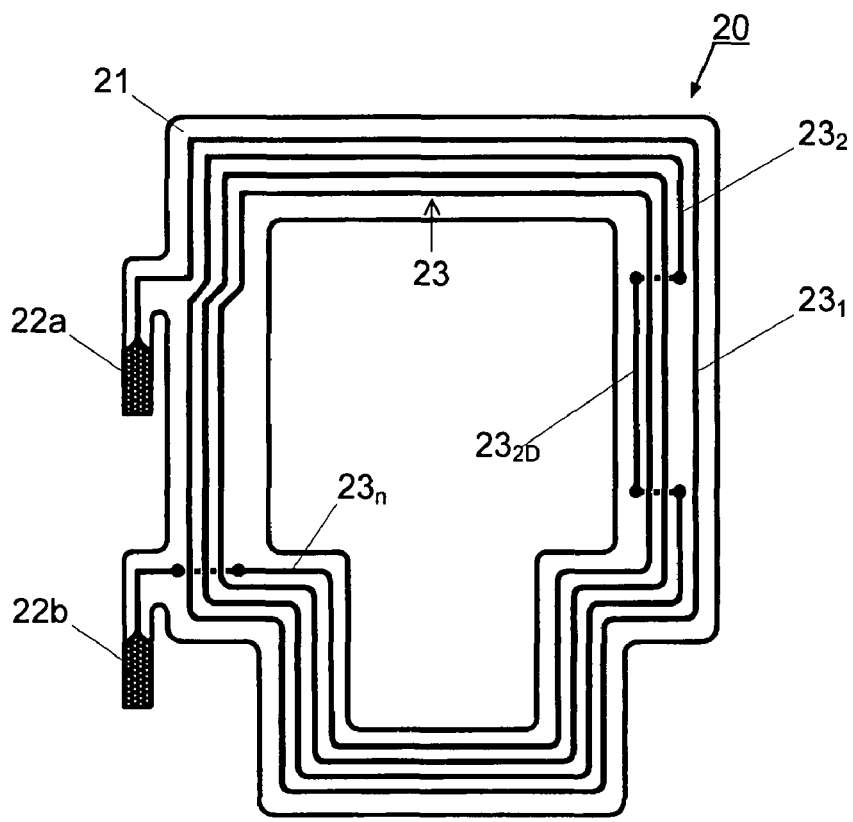
FIG. 8A is a plan view showing the configuration of an RFID antenna according to a second embodiment of the invention.
Figure 8B:
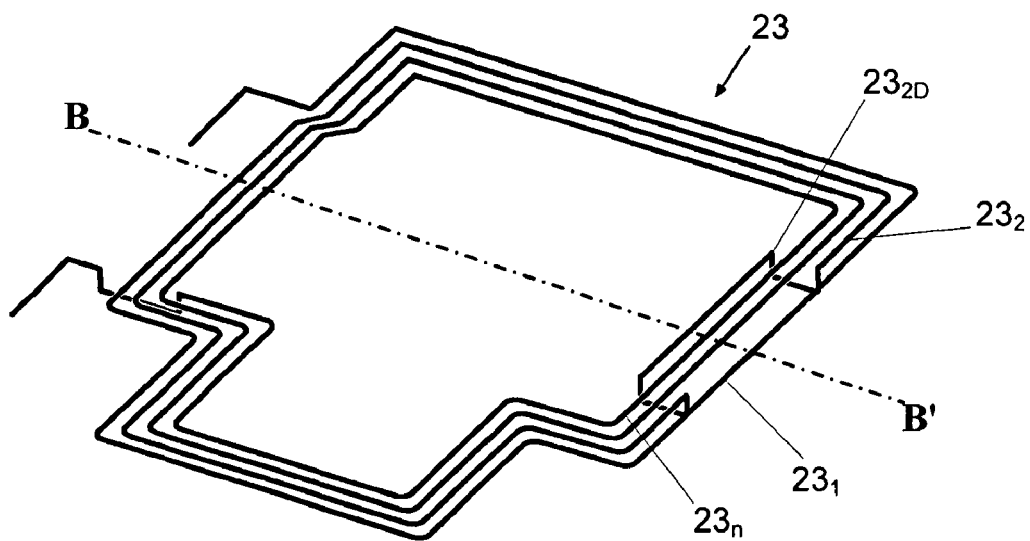
FIG. 8B is a perspective view showing the conductive coil of the RFID antenna shown in FIG. 8A.

The RFID antenna 20 and the conductive coil 23 in this case are shown in FIGS. 8A and 8B. As shown in those diagrams, the conductive coil 23 formed at the RFID antenna 20 according to the second embodiment has an antenna pattern provided by bending a part of a second coil turn $23_2$ (e.g., linear portion) which is inward of the outermost coil turn $23_1$ by one turn to form a curved portion $23_{2D}$ which is placed inward of the innermost coil turn $23_n$.

Figure 9A:
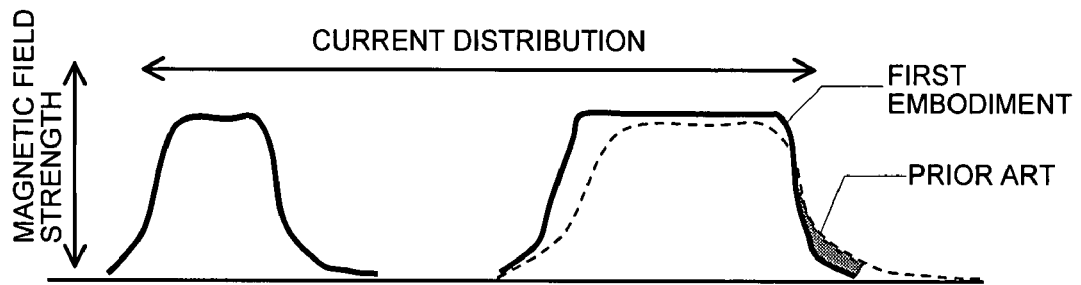
FIG. 9A is a diagram showing the characteristics of the RFID antenna according to the first embodiment of the invention shown in FIG. 7A and the characteristics of the conventional RFID antenna shown in FIG. 7B, one over the other.

While the RFID antenna 20 of the first embodiment which has the outermost coil turn $23_1$ bent can make the magnetic field strength at the center portion of the loop antenna higher than that of the conventional RFID antenna as shown in FIG. 7C, the magnetic field strength near the outermost coil turn $23_1$ or at the outer periphery of the loop antenna becomes lower than that of the conventional RFID antenna as shown by the hatching in FIG. 9A. This is because the partial bending of the outermost coil turn $23_1$ causes the pattern of the outermost coil turn $23_1$ to be partially gone, so that a magnetic field will not be generated there.

As described above, the RFID antenna 20 according to the second embodiment has a relatively large loop diameter matching with the loop diameter of the loop antenna used in the reader/writer for a strong electromagnetic field, whereas the configuration of the first embodiment has the partly-bent outermost coil turn $23_1$ of the conductive coil 23 forming the loop antenna, which is substantially equivalent to the size of the loop becoming smaller accordingly. When the RFID antenna 20 is used in the RFID system for a strong electromagnetic field which demands the communication distance characteristic of the gate RFID or the like, therefore, the communication distance characteristic drops in some cases.

Figure 9B:
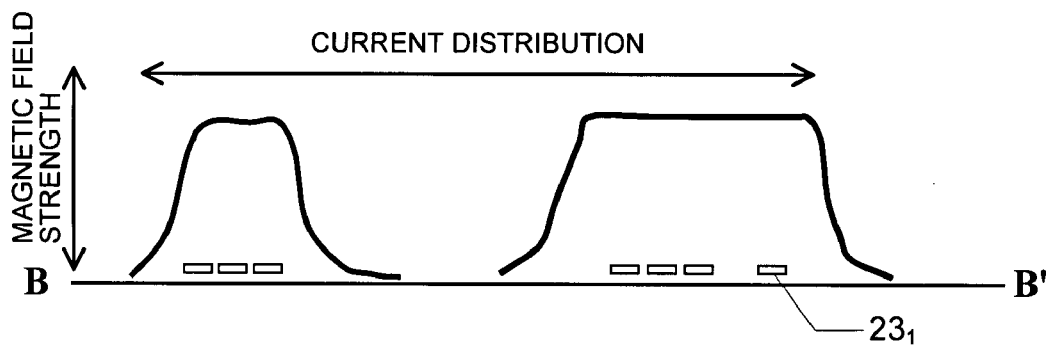
FIG. 9B is a diagram illustrating a current distribution and magnetic field strength along a dot chain line B-B' in FIG. 8B as the characteristics of the RFID antenna according to the second embodiment of the invention.

As the second coil turn $23_2$, not the outermost coil turn $23_1$, of the conductive coil 23 according to the second embodiment is bent, the pattern of the outermost coil turn $23_1$ remains. The characteristics of the RFID antenna 20 using the conductive coil 23 is illustrated in FIG. 9A. FIG. 9B is a diagram illustrating a current distribution and magnetic field strength along a dot chain line B-B' in FIG. 8B.

Figure 9C:
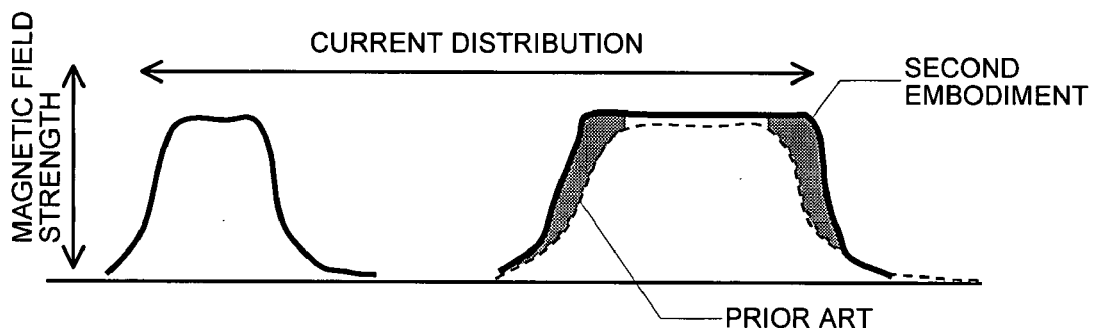
FIG. 9C is a diagram showing the characteristics of the RFID antenna according to the second embodiment of the invention shown in FIG. 9B and the characteristics of the conventional RFID antenna shown in FIG. 7B, one over the other.

FIG. 9C shows the characteristics of the RFID antenna 20 according to the second embodiment and the characteristics of the conventional RFID antenna shown in FIG. 7B, one over the other. In FIG. 9C, the broken line indicates the characteristics of the conventional RFID antenna while the solid line indicates the characteristics of the RFID antenna 20 according to the second embodiment.

As shown by the hatching in FIG. 9C, the RFID antenna 20 of the second embodiment can make the magnetic field strength at the outer periphery of the antenna higher as well as make the magnetic field strength at the center portion of the antenna higher as compared with the conventional RFID antenna.

That is, it is possible to not only prevent the occurrence of a non-communicatable area at the time of communication with the reader/writer for a slight electromagnetic field, which would otherwise be caused by a low magnetic field strength at the center portion of the antenna, but also to keep the communication distance characteristic which is required at the time of communication with the reader/writer for a strong electromagnetic field.

Therefore, it is possible to ensure reliable communication with a reader/writer for a slight electromagnetic field whose loop antenna has a relatively small loop diameter as well as a reader/writer for a strong electromagnetic field whose loop antenna has a relatively large loop diameter.

Third Embodiment

The first and second embodiments employ the configurations where the magnetic field strength at the center portion of the antenna is compensated for by bending a part of the conductive coil 23. Alternatively, a part of the conductive coil 23 (e.g., linear portion) may be branched to form a conductive pattern which compensates for the magnetic field strength at the center portion of the antenna.

Figure 10A:
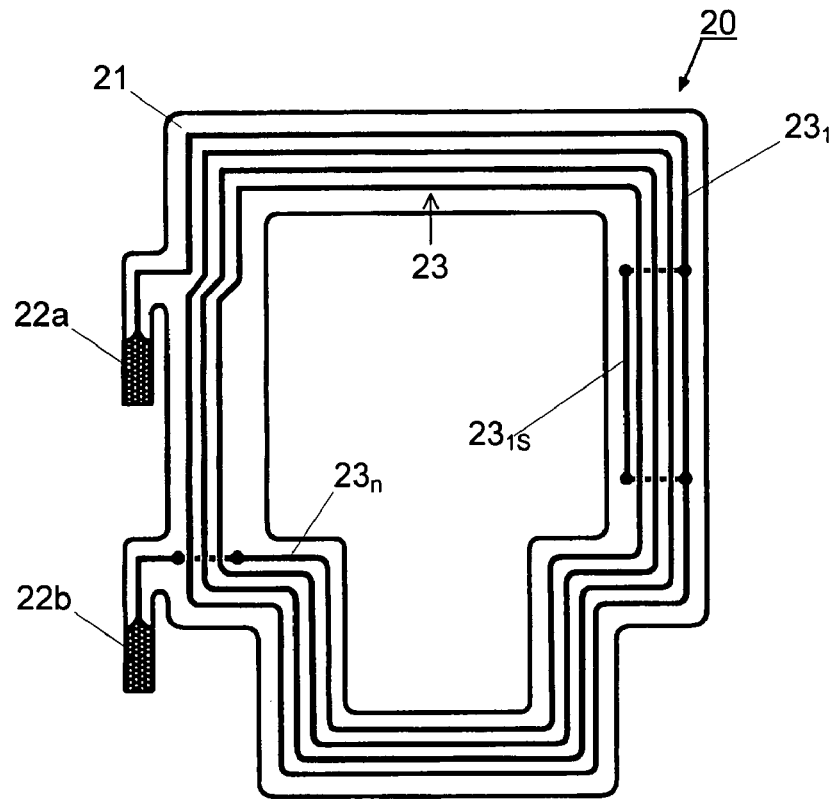
FIG. 10A is a plan view showing the configuration of an RFID antenna according to a third embodiment of the invention.

An example of the configuration of the third embodiment where the outermost coil turn $23_1$ of the conductive coil 23 is branched will be described referring to FIGS. 10A and 10B. FIG. 10A is a plan view showing the RFID antenna 20 according to the third embodiment, and FIG. 10B is a perspective view showing the conductive coil 23 according to this embodiment.

Figure 10B:
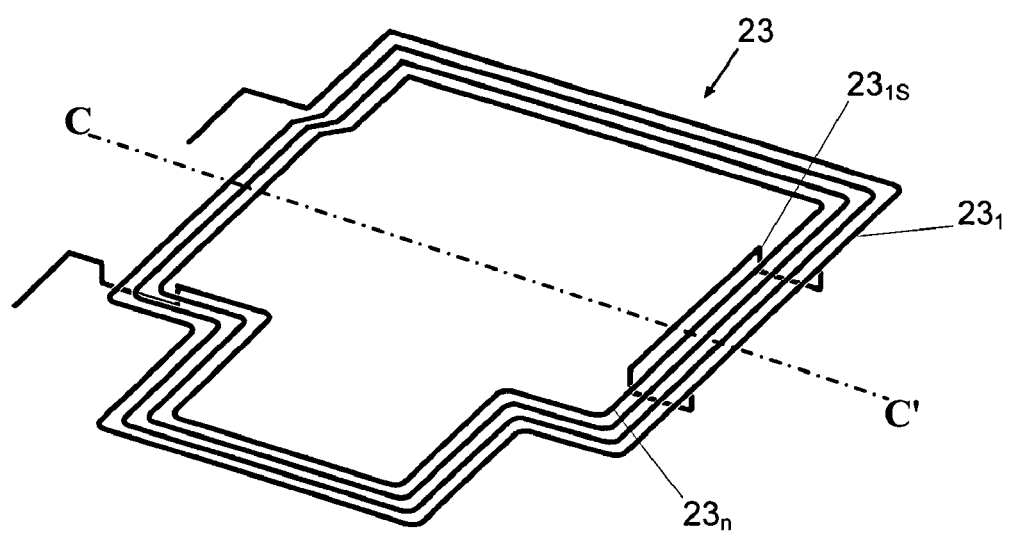
FIG. 10B is a perspective view showing the conductive coil of the RFID antenna shown in FIG. 10A.

As shown in FIGS. 10A and 10B, the feature of the conductive coil 23 according to the third embodiment lies in that the conductive coil 23 has an antenna pattern having a bypass portion $23_{1S}$ formed by branching the conductive coil 23 from the outermost coil turn $23_1$, setting the branched portion inward of the innermost coil turn $23_n$, and then returning the branched portion back to the outermost coil turn $23_1$.

Figure 11A:
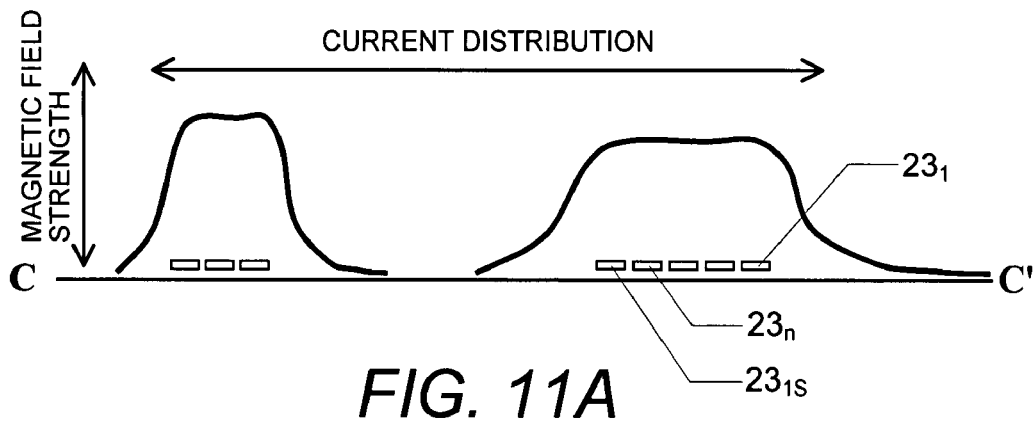
FIG. 11A is a diagram illustrating a current distribution and magnetic field strength along a dot chain line C-C' in FIG. 10B as the characteristics of the RFID antenna according to the third embodiment of the invention.

The characteristics of the RFID antenna 20 using the conductive coil 23 with such a structure is illustrated in FIG. 11A. FIG. 11A is a diagram illustrating a current distribution and magnetic field strength along a dot chain line C-C' in FIG. 10B.

Figure 11B:
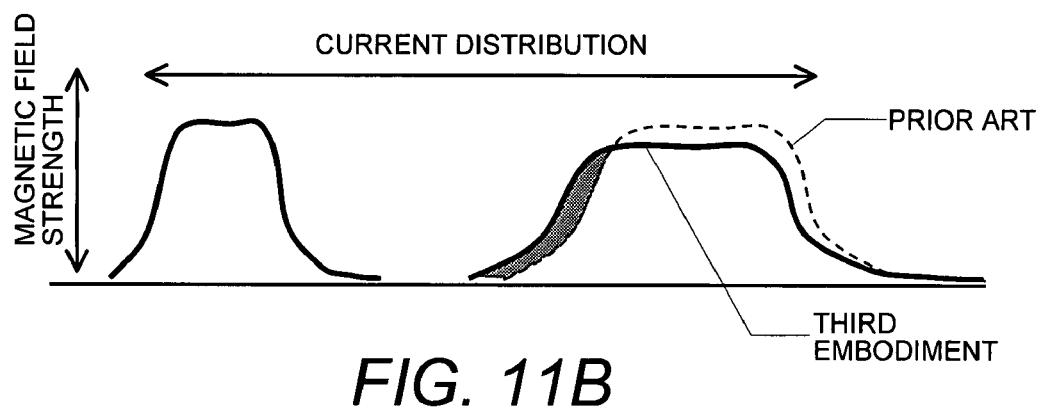
FIG. 11B is a diagram showing the characteristics of the RFID antenna according to the third embodiment of the invention shown in FIG. 11A and the characteristics of the conventional RFID antenna shown in FIG. 7B, one over the other.

FIG. 11B shows the characteristics of the RFID antenna 20 according to the third embodiment shown in FIG. 11A and the characteristics of the conventional RFID antenna shown in FIG. 7B, one over the other. In FIG. 11B, the broken line indicates the characteristics of the conventional RFID antenna while the solid line indicates the characteristics of the RFID antenna 20 according to the third embodiment.

As shown by the hatching in FIG. 11B, the RFID antenna 20 using the conductive coil 23 of the third embodiment can make the magnetic field strength at the center portion of the antenna higher as compared with the conventional RFID antenna. That is, it is possible to prevent the occurrence of a non-communicatable area originating from an insufficient amount of the magnetic flux when the antenna comes close to the reader/writer for a slight electromagnetic field.

This effect is acquired both in the first and second embodiments described above. When a part of the conductive coil 23 is bent as in the first embodiment or the second embodiment to compensate for the magnetic field strength at the center portion of the antenna, however, the magnetic field strength at the center portion of the antenna may become unnecessarily high. This is because the current flowing in the bent coil directly passes in the innermost coil turn $23_n$, so that a magnetic field strength according to the amount of the current in the conductive coil 23 appears at the bent portion.

When the magnetic field strength at the center portion of the loop antenna is low, as mentioned above, the amount of the magnetic flux crossing between the antenna and the reader/writer for a slight electromagnetic field decreases, generating a non-communicatable area. If the magnetic field strength becomes unnecessarily high, however, a non-communicatable area may be generated when the antenna communicates with the reader/writer for a slight electromagnetic field. The antenna of the reader/writer and the RFID antenna 20 both function as a resonance circuit to wirelessly communicate with each other. When the RFID antenna 20 which has an unnecessary high magnetic field strength at the center portion of the antenna is set close to the reader/writer, therefore, the magnetic coupling therebetween becomes too strong so that their resonance frequencies deviate from each other. This disables the transmission and reception of signals of the desired frequency, which may generate a non-communicatable area of about 1 mm or less.

With the structure of the conductive coil 23 according to the third embodiment, the bypass portion $23_{1S}$ branched from the outermost coil turn $23_1$ passes inward of the innermost coil turn $23_n$, so that the current in the outermost coil turn $23_1$ is branched to flow to the bypass portion $23_{1S}$. Therefore, the magnetic field strength at the center portion of the loop antenna does not become higher than that in the case where a part of the conductive coil 23 is bent.

Figure 11C:
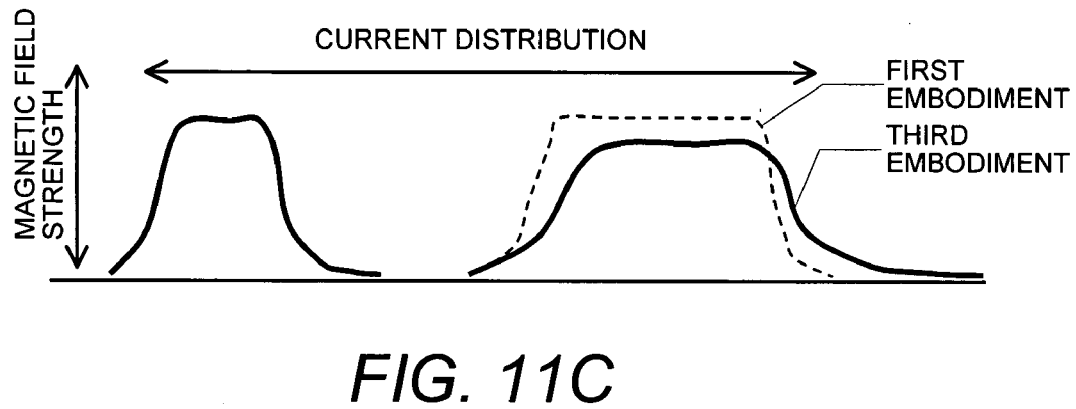
FIG. 11C is a diagram showing the characteristics of the RFID antenna according to the third embodiment of the invention shown in FIG. 11A and the characteristics of the RFID antenna according to the first embodiment shown in FIG. 7A, one over the other.

Such a characteristic will be explained referring to FIG. 11C. FIG. 11C shows the characteristics of the RFID antenna 20 according to the third embodiment shown in FIG. 11A and the characteristics of the RFID antenna 20 according to the first embodiment shown in FIG. 7A, one over the other. That is, the case where the coil is branched from the outermost coil turn $23_1$ (third embodiment) is compared with the case where the outermost coil turn $23_1$ is bent (first embodiment). In FIG. 11C, the broken line indicates the characteristics of the RFID antenna 20 according to the first embodiment while the solid line indicates the characteristics of the RFID antenna 20 according to the third embodiment.

As shown in FIG. 11B, the magnetic field strength at the center portion of the RFID antenna 20 of the third embodiment is higher than that of the conventional RFID antenna, but is lower than that of the RFID antenna 20 of the first embodiment.

In addition, the bypass portion $23_{1S}$ of the conductive coil 23 according to the third embodiment is formed by branching the coil portion from the outermost coil turn $23_1$, so that the pattern of the outermost coil turn $23_1$ remains. This can make the magnetic field strength at the outer peripheral portion of the antenna higher than that of the RFID antenna 20 according to the first embodiment as shown in FIG. 11C.

That is, it is possible to prevent not only a non-communicatable area which is generated by a low magnetic field strength at the center portion of the antenna, but also a non-communicatable area which is generated by the magnetic field strength becoming too high. At the time the antenna communicates with the reader/writer for a strong electromagnetic field, a sufficient communication distance characteristic can be acquired.

Therefore, it is possible to ensure reliable communication with a reader/writer for a slight electromagnetic field whose loop antenna has a relatively small loop diameter as well as a reader/writer for a strong electromagnetic field whose loop antenna has a relatively large loop diameter.

Fourth Embodiment

The foregoing description of the third embodiment has explained a configurational example where the coil portion is branched from the outermost coil turn $23_1$ of the conductive coil 23. Alternatively, a part of the coil (e.g., linear portion) other than the outermost coil turn $23_1$ may be branched.

Figure 12A:
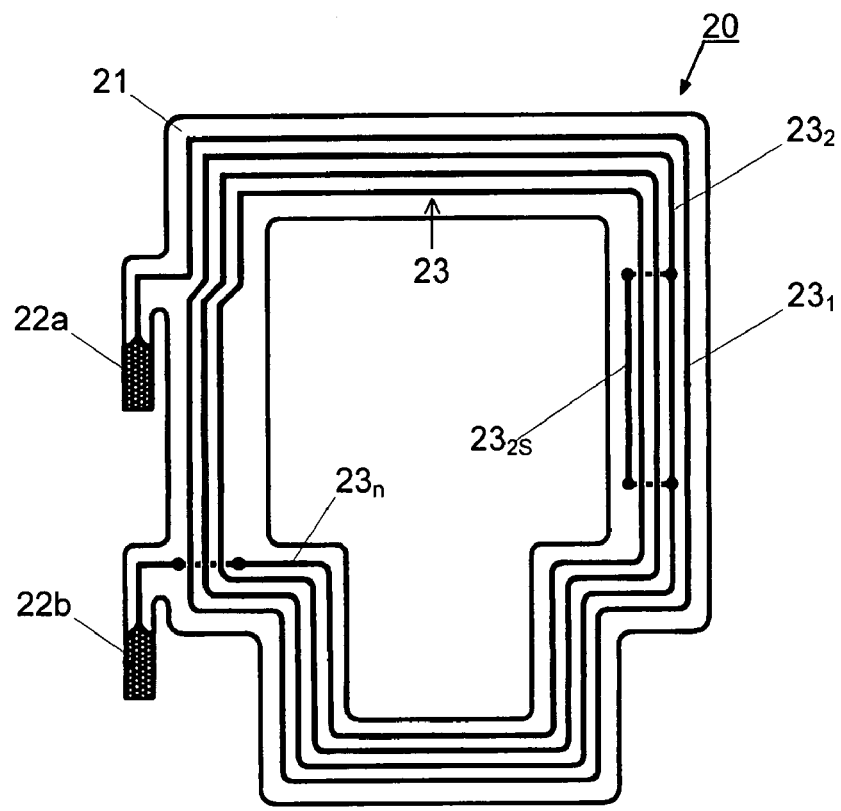
FIG. 12A is a plan view showing the configuration of an RFID antenna according to a fourth embodiment of the invention.
Figure 12B:
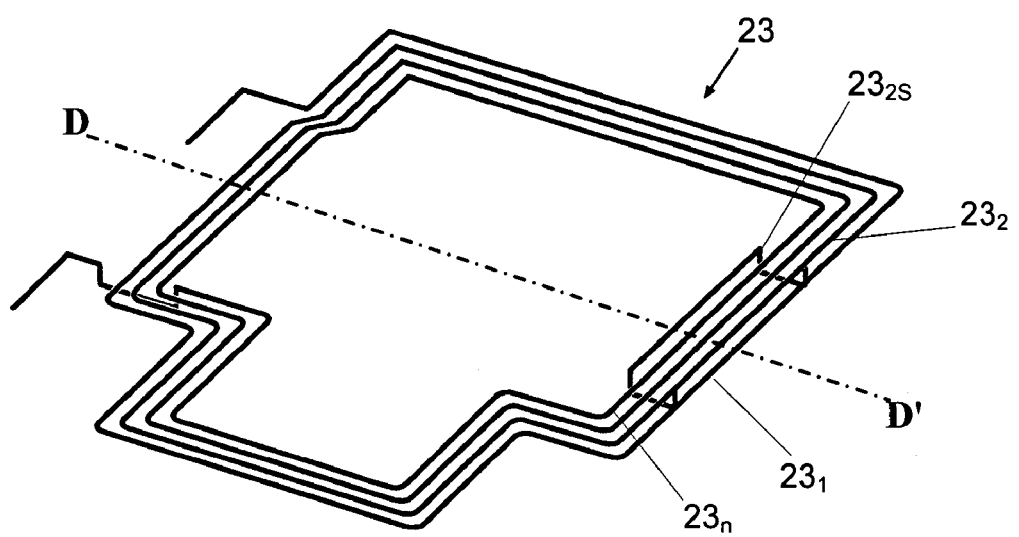
FIG. 12B is a perspective view showing the conductive coil of the RFID antenna shown in FIG. 12A.

FIGS. 12A and 12B show the RFID antenna 20 and the conductive coil 23 in this case. FIG. 12A is a plan view showing the RFID antenna 20 according to the fourth embodiment, and FIG. 12B is a perspective view showing the conductive coil 23 shown in FIG. 12A.

As shown in the diagrams, the feature of the conductive coil 23 formed at the RFID antenna 20 according to the fourth embodiment lies in that the conductive coil 23 has an antenna pattern having a bypass portion $23_{2S}$ formed by branching the conductive coil 23 from the second coil turn $23_2$ or the coil turn located inward of the outermost coil turn $23_1$ by one turn, setting the branched portion inward of the innermost coil turn $23_n$, and then returning the branched portion back to the second coil turn $23_2$.

The characteristics of the RFID antenna 20 using the conductive coil 23 with such a structure will be explained referring to FIGS. 13A to 13C.

Figure 13A:
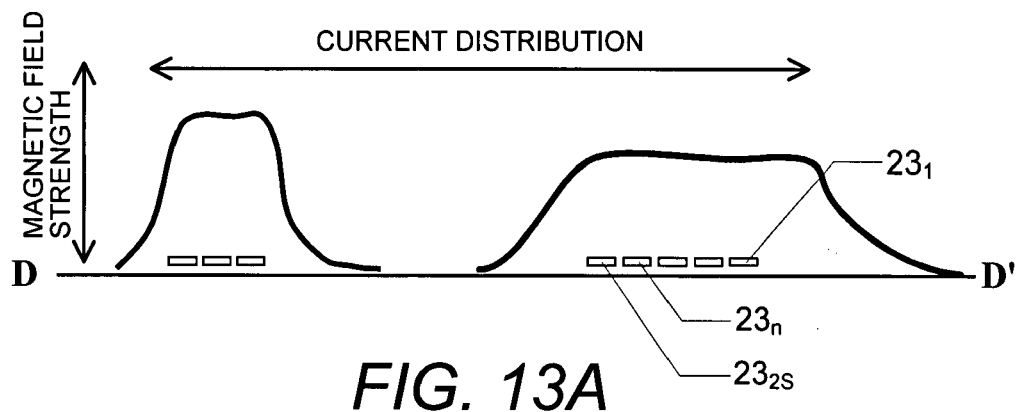
FIG. 13A is a diagram illustrating a current distribution and magnetic field strength along a dot chain line D-D' in FIG. 12B as the characteristics of the RFID antenna according to the fourth embodiment of the invention.

FIG. 13A is a diagram illustrating a current distribution and magnetic field strength along a dot chain line D-D' in FIG. 12B.

The conductive coil 23 according to the fourth embodiment, like the conductive coil 23 of the third embodiment, has the branch-originated bypass portion passing inward of the innermost coil turn $23_n$, so that the magnetic field strength at the center portion of the antenna can be adequately compensated for as done in the third embodiment.

Figure 13B:
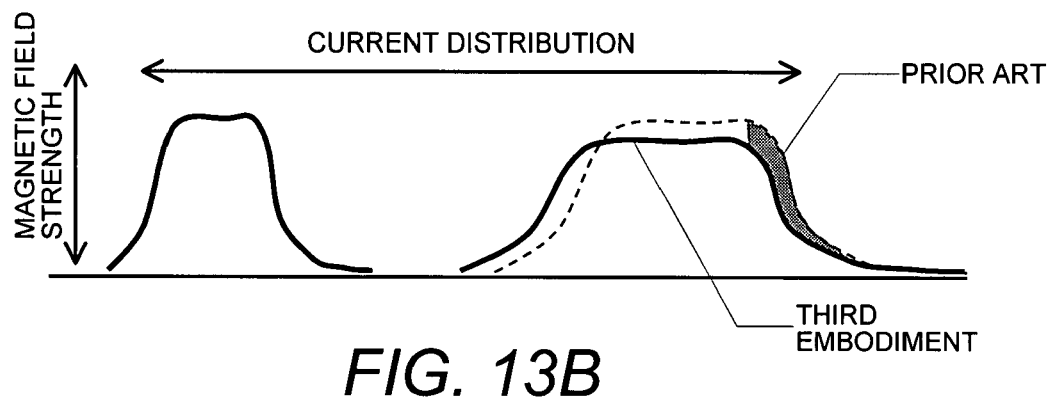
FIG. 13B is a diagram showing the characteristics of the RFID antenna according to the third embodiment of the invention shown in FIG. 11A and the characteristics of the conventional RFID antenna shown in FIG. 7B, one over the other.

FIG. 13B shows the characteristics of the RFID antenna 20 according to the third embodiment which has a branching structure similar to that of the fourth embodiment, and the characteristics of the conventional RFID antenna shown in FIG. 7B, one over the other. As shown by the hatching in FIG. 13B, the magnetic field strength at the outer peripheral portion of the RFID antenna 20 according to the third embodiment may become lower than that of the conventional RFID antenna.

This is because the current flowing in the outermost coil turn $23_1$ is branched to the bypass portion $23_{1S}$ in the third embodiment where the bypass portion is branched from the outermost coil turn $23_1$, so that even with the pattern of the outermost coil turn $23_1$ remaining, the current in the outermost coil turn $23_1$ decreases relatively.

By way of contrast, the bypass portion $23_{2S}$ is branched from the second coil turn $23_2$ of the conductive coil 23 in the RFID antenna 20 according to the fourth embodiment, so that the pattern of the outermost coil turn $23_1$ remains. Accordingly, a sufficient current flows in the outermost coil turn $23_1$, so that unlike in the third embodiment, the magnetic field strength at the outer peripheral portion of the antenna does not decrease.

Figure 13C:
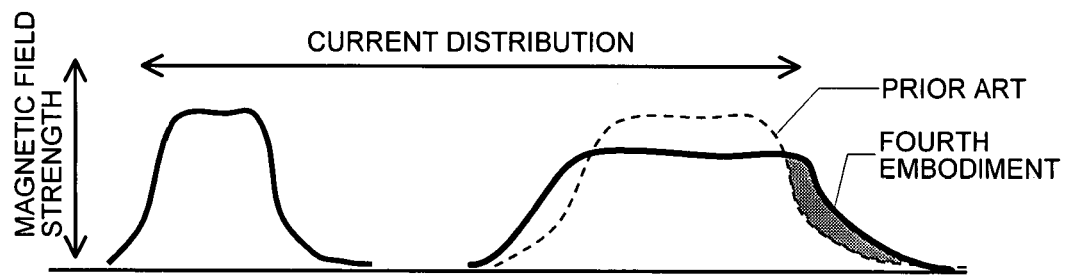
FIG. 13C is a diagram showing the characteristics of the RFID antenna according to the fourth embodiment of the invention shown in FIG. 13A and the characteristics of the conventional RFID antenna shown in FIG. 7B, one over the other.

FIG. 13C shows the characteristics of the RFID antenna 20 according to the fourth embodiment and the characteristics of the conventional RFID antenna shown in FIG. 7B, one over the other. As shown by the hatching in FIG. 13C, the magnetic field strength at the outer peripheral portion of the RFID antenna 20 according to the fourth embodiment can be made higher than that of the conventional RFID antenna.

That is, it is possible to obtain, at the center portion of the antenna, a magnetic field strength adequate not to generate a non-communicatable area when the antenna communicates with the reader/writer for a slight electromagnetic field, and to generate, at the outer peripheral portion of the antenna, a magnetic field strength sufficient to acquire the communication distance characteristic that is required when the antenna communicates with the reader/writer for a strong electromagnetic field.

It is therefore possible to ensure reliable communication with a reader/writer for a slight electromagnetic field whose loop antenna has a relatively small loop diameter as well as a reader/writer for a strong electromagnetic field whose loop antenna has a relatively large loop diameter.

According to the embodiment, as described above, the magnetic field strength at the center portion of the antenna can be compensated for by bending or branching a part of the conductive coil 23 of the RFID antenna, so that even the antenna whose loop diameter is compatible with the reader/writer for a strong electromagnetic field can have good communications with the reader/writer for a slight electromagnetic field.

As apparent from the descriptions of the individual embodiments, the magnetic field strength characteristic obtained by the RFID antenna of the invention changes depending on whether a coil portion is bent or branched, or which coil turn is to be bent or branched, and the length and position of the conductor which constitutes the bent portion or the bypass portion.

The characteristics demanded of the RFID antenna differ according to various conditions, such as the size and shape of the battery lid to be mounted, and the internal structure of the apparatus body where the RFID antenna is to be mounted. Therefore, the demanded antenna characteristics can be acquired easily by optimizing the length and position of the bent portion or bypass portion formed at the RFID antenna according to the invention.

In this case, with the configuration where the conductor of the antenna is bent as exemplified in the first embodiment or the second embodiment, changing the length and position of the bent portion requires the general design and fabrication of the conductive coil. With the branch structures as exemplified in the third embodiment and the fourth embodiment, however, the bypass portions of various lengths and shapes should be prepared and selectively added to an existing loop antenna. This provides a higher degree of freedom in the design and fabrication of the RFID antenna, thus making it easier to acquire an antenna with preferable characteristics.

The length, shape and position of the bent portion or the bypass portion of each embodiment described above, and which coil turn should be bent or branched are just examples, and are not limited to those illustrated and described.

Reduction in the communication distance characteristic originating from other factors than the magnetic field strength characteristic can also be prevented by setting the position of the bent portion or the bypass portion according to the internal structure of the apparatus where the RFID antenna is to be mounted.

In the case where the key sheet support 13' or the like is formed by projecting a part of the middle case 13 of a metal like a magnesium alloy, as shown in FIG. 4, for example, an eddy current may be generated by the metal portion, thereby making the communication distance shorter. In such a case, if the bent portion or the bypass portion of the RFID antenna is provided at a position close to the metal portion that generates the eddy current, the high-frequency current flowing around the metal portion can be reduced. As a result, the eddy current which is generated around the metal portion like the key sheet support 13' becomes smaller, making it possible to prevent the adverse influence of shortening the communication distance.

Although the coil turn which forms the bent portion or the bypass portion of the RFID antenna according to the invention may be any coil turn, it is preferably a coil turn other than the outermost coil turn. That is, because the innermost coil turn itself influences the magnetic field strength at the center portion of the antenna, the bent portion or the bypass portion if formed at such a coil turn, does not bring about a large change in magnetic field strength at the center portion of the antenna. To compensate for the magnetic field strength at the center portion of the antenna in order to realize good communications with the reader/writer for a slight electromagnetic field, therefore, it is effective to provide the bent portion or the bypass portion at a coil turn other than the innermost coil turn.

Although a foldable cellular phone is a portable electronic device in the above-described embodiments, the invention is not limited to this type, but may be adapted to other types of portable electronic devices, such as PDA (Personal Data Assistance).

Although the embodiments employ configurations where a flexible board is provided at the inner side of the battery lid, the flexible board may be provided at the inner side or the top surface of another case member, such as the inner side or the like of the back case (lower case 11) or the back cover which constitutes the back side of the device case.

Further, the shapes or the like of the battery lid and the antenna are optional, and specific detailed structures thereof or the like can also be changed adequately.

The present application is based on prior Japanese Patent Application No. 2006-236847 filed on Aug. 31, 2006 and Japanese Patent Application No. 2007-185969 filed on Jul. 17, 2007, the entire contents of which are incorporated herein by reference.

What is claimed is:

1. A loop antenna comprising:
 a planar coil formed by winding a conductor; and
 an antenna pattern in which a part of a coil turn of the conductor which is other than an innermost coil turn is placed inward of the innermost coil turn;
 wherein the antenna pattern is provided by branching the part of the coil turn of the conductor which is other than the innermost coil turn such that the part of the coil turn is placed inward of the innermost coil turn.

2. A portable electronic device having a Radio Frequency Identification (RFID) function comprising:
 a loop antenna for use in the RFID function, the loop antenna having a planar coil formed by a winding conductor;
 wherein the loop antenna includes a loop diameter corresponding to an RFID having a strong electromagnetic characteristic, and includes an antenna pattern in which a part of a coil turn of the conductor which is other than an innermost coil turn is placed inward of the innermost coil turn; and
 wherein the loop antenna includes the antenna pattern provided by branching the part of the coil turn of the conductor which is other than the innermost coil turn such that the part of the coil turn is placed inward of the innermost coil turn.

* * * * *